US012162899B2

(12) United States Patent
Yam et al.

(10) Patent No.: US 12,162,899 B2
(45) Date of Patent: Dec. 10, 2024

(54) PHOTOCHROMIC GERMOLE-FUSED DIARYLETHENES AND PRODUCTION THEREOF

(71) Applicant: The University of Hong Kong, Hong Kong (CN)

(72) Inventors: Vivian Wing-Wah Yam, Hong Kong (CN); Nathan Man-Wai Wu, Hong Kong (CN); Tony Ho-Ching Fung, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 9 days.

(21) Appl. No.: 18/060,291

(22) Filed: Nov. 30, 2022

(65) Prior Publication Data

US 2023/0167139 A1 Jun. 1, 2023

Related U.S. Application Data

(60) Provisional application No. 63/284,464, filed on Nov. 30, 2021.

(51) Int. Cl.
*C07F 7/30* (2006.01)

(52) U.S. Cl.
CPC ..................... *C07F 7/30* (2013.01)

(58) Field of Classification Search
CPC ....................................................... C07F 7/30
See application file for complete search history.

(56) References Cited

U.S. PATENT DOCUMENTS

| | | | |
|---|---|---|---|
| 5,175,079 A | 12/1992 | Van et al. | |
| 5,183,726 A | 2/1993 | Taniguchi et al. | |
| 5,443,940 A | 8/1995 | Tatezono et al. | |
| 5,622,812 A | 4/1997 | Tatezono et al. | |
| 6,359,150 B1 | 3/2002 | Fukudome et al. | |
| 9,708,528 B2 | 7/2017 | Yam et al. | |
| 2015/0166581 A1* | 6/2015 | Braddock-Wilking | ... C07F 7/30 436/130 |
| 2022/0162235 A1* | 5/2022 | Braddock-Wilking | ...... C07F 7/0816 |

FOREIGN PATENT DOCUMENTS

| | | |
|---|---|---|
| JP | 50-59025 A | 5/1975 |
| JP | 2-250877 A | 10/1990 |
| JP | 3-14538 A | 1/1991 |
| JP | 3-261762 A | 11/1991 |
| JP | 3-261781 A | 11/1991 |
| JP | 3-271286 A | 12/1991 |
| JP | 4-282378 A | 10/1992 |
| JP | 5-222035 A | 8/1993 |
| JP | 5-222036 A | 8/1993 |
| JP | 5-222037 A | 8/1993 |
| JP | 6-199846 A | 7/1994 |
| JP | 10-45732 A | 2/1998 |
| JP | 2000-72768 A | 3/2000 |
| JP | 2000-344693 A | 12/2000 |
| JP | 2001-48875 A | 2/2001 |
| JP | 2002-226477 A | 8/2002 |
| JP | 2002-265468 A | 9/2002 |
| JP | 2002-293784 A | 10/2002 |

OTHER PUBLICATIONS

N. Wu et al., 6 ACS Materials Letters, 314-320 (2023) (Year: 2023).*
O. Shynkaruk et al., 22 Chemistry a European Journal, 248-257 (2016) (Year: 2016).*
Oxford Dictionary of Chemistry 169 (John Daintith ed., 6th ed., 2008) (Year: 2008).*
M. Smith et al., 5 Molecular BioSystems, 962-972 (2009) (Year: 2009).*
A. Ondrus et al., Chem Commun., 4151-4165 (2009) (Year: 2009).*
S. Mirozoeva et al. J. Med. Chem. 45, 563-566 (2002) (Year: 2002).*
Yam, V.W.-W., et al., "Photochromic and Luminescence Switching Properties of a Versatile Diarylethene-Containing 1, 10-Phenanthroline Ligand and Its Rhenium(I) Complex," J. Am. Chem. Soc., 2004, 126(40):12734-12735.
Lee, P.H.-M., et al., "Metal Coordination-Assisted Near-Infrared Photochromic Behavior: A Large Perturbation on Absorption Wavelength Properties of N, N-Donor Ligands Containing Diarylethene Derivatives by Coordination to the Rhenium(I) Metal Center," J. Am. Chem. Soc., 2007, 129(19):6058-6059.
Yam, V.W.-W., et al., "Photochromic Diarylethene-Containing Ionic Liquids and N-Heterocyclic Carbenes," J. Am. Chem. Soc., 2009, 131(3):912-913.
Poon, C.-T., et al., "A Versatile Photochromic Dithienylethene-Containing B-Diketonate Ligand: Near-Infrared Photochromic Behavior and Photoswitchable Luminescence Properties upon Incorporation of a Boron(III) Center," J. Am. Chem. Soc., 2010, 132(40):13992-13993.
Chan, J.C.-H., et al., "Diarylethene-Containing Cyclometalated Platinum(II) Complexes: Tunable Photochromism via Metal Coordination and Rational Ligand Design," Journal of the American Chemical Society, 2011, 133:12690-12705.
Chan, J.C.-H., et al., "Tunable Photochromism in Air-Stable, Robust Dithienylethene-Containing Phospholes through Modifications at the Phosphorus Center," Angew. Chem. Int. Ed., 2013, 52:11504-11508.

(Continued)

*Primary Examiner* — Alexander R Pagano
(74) *Attorney, Agent, or Firm* — Saliwanchik, Lloyd & Eisenschenk

(57) ABSTRACT

A germole-fused diarylethene-based compound is presented that includes a germanium-containing five-membered ring structure with an ethene bridge fused to photoactive bis-aryl rings. The germole-fused diarylethene-based compound isomerizes between a ring-open and a ring-closed form upon irradiation and to allow optical storage or photoswitching devices. A method to form the germole-fused diarylethene-based compound is through a rhodium catalyzed coupling between a 1-germyl-aryl-2-boronic ester, 1-germyl-heteroaryl-2-boronic ester, or 1-germyl-alkenyl-2-boronic ester with the 1,2-diarylethyne. The germole-fused diarylethene-based compounds display tunable photophysical properties of the photogenerated closed form, with excellent thermal irreversibility and a robust fatigue resistance.

16 Claims, 6 Drawing Sheets

(56) References Cited

OTHER PUBLICATIONS

Chan, J.C.-H., et al., "A Highly Efficient Silole-Containing Dithienylethene with Excellent Thermal Stability and Fatigue Resistance: A Promising Candidate for Optical Memory Storage Materials," Journal of the American Chemical Society, 2014, 136:16994-16997.

Wu, N.M.-W., et al., "Photochromic benzo[b]phosphole oxide with excellent thermal irreversibility and fatigue resistance in the thin film solid state via direct attachment of dithienyl units to the weakly aromatic heterocycle," Chemical Science, 2017, 8:1309-1315.

Wu, N.M.-W., et al., "Photochromic Heterocycle-Fused Thieno[3,2-b]phosphole Oxides as Visible Light Switches without Sacrificing Photoswitching Efficiency," Journal of the American Chemical Society, 2017, 139:15142-15150.

Wu, N.M.-W., et al., "Photochromic Benzo[b]phosphole Alkynylgold(I) Complexes with Mechanochromic Property to Serve as Multistimuli-Responsive Materials," Angew. Chem. Int. Ed., 2019, 58:3027-3031.

Wu, N.M.-W., et al., "Photochromic Barbiturate Pendant-Containing Benzo[b]phosphole Oxides with Co-Assembly Property and Photoinduced Morphological Changes," ACS Applied Materials & Interfaces, 2019, 11:40290-40299.

Wong, C.-L., et al., "Photoresponsive Dithienylethene-Containing Tris(8-hydroxyquinolinato)aluminum(III) Complexes with Photocontrollable Electron-Transporting Properties for Solution-Processable Optical and Organic Resistive Memory Devices," Journal of the American Chemical Society, 2020, 142:12193-12206.

Zhu, W., et al., "Unprecedented Stability of a Photochromic Bisthienylethene Based on Benzobisthiadiazole as an Ethene Bridge," Angew. Chem. Int. Ed., 2011, 50:10986-10990.

Li, W., et al., "Separation of Photoactive Conformers Based on Hindered Diarylethenes: Efficient Modulations in Photocyclization Quantum Yields," Angew. Chem. Int. Ed., 2014, 53:4603-4607.

Irie, M., et al., "Thermally Irreversible Photochromic Systems. Reversible Photocyclization of Diarylethene Derivatives," J. Org. Chem., 1988, 53(4):803-808.

Irie, M., et al., "Photochromism of Diarylethene Molecules and Crystals: Memories, Switches, and Actuators," Chemical Reviews, 2014, 114:12174-12277.

Tobisu, M., et al., "Rhodium-Catalyzed Synthesis of Germoles via the Activation of Carbon-Germanium Bonds," Organic Letters, 2011, 13(12):3282-3284.

* cited by examiner

PHOTOCHROMIC GERMOLE-FUSED DIARYLETHENES AND PRODUCTION THEREOF

CROSS-REFERENCE TO RELATED APPLICATION

This application claims the benefit of U.S. Provisional Application Ser. No. 63/284,464, filed Nov. 30, 2021, which is hereby incorporated by reference in its entirety including any tables, figures, or drawings.

BACKGROUND OF THE INVENTION

Photochromism is defined as "a reversible photochemical isomerization of a single molecule being excited by the absorption of light", in which these two isomers usually display distinct photophysical properties. In general, the colorless state, which is thermodynamically stable, features photoinduced color changes to offer the colored state upon photoirradiation. However, the backward reaction can occur either thermally (T-type) or photochemically (P-type). Photochromic compounds have drawn increasing attention from the academia and industry over decades because of their potential application of optical memory storages and photoswitchable functional devices.

Among all photoresponsive compounds, diarylethene has been regarded as one of the most promising candidates of photochromic materials for practical applications in the foreseeable future, given its excellent thermal irreversibility, robust fatigue resistance, large difference in the absorption properties between the open and the photogenerated closed forms, as well as relatively high photocyclization/photocycloreversion quantum yields. From the perspective of chemical structure, diarylethene is usually constructed by an incorporation of the diaryl units as pendant groups to the ethene bridge-containing cyclic moiety as backbone. Although diarylethene-based systems have been extensively investigated, the studies have been confined to modification on the pendant groups of perfluorocyclopentene-based diarylethene for the tuning of photophysical and photochromic behaviors, while the utilization of different heterocycles as the ethene bridge, which is directly connected to the diaryl units, to develop novel diarylethene-based system has generated little activity.

In addition to commonly used heterocycles, such as pyrroles, thiophenes, indoles, thiazoles, imidazoles and others, phospholes and siloles have recently been demonstrated to serve as photochromic materials with promising photochromic properties. Phosphole- and silole-fused diarylethene-based systems where a weakly aromatic phosphole or silole is directly attached to a photoactive diaryl units have been recently studied. It appears that weak aromaticity of the heterocycles potentially assists the "ethene bridge" to participate in a photochromic reaction, which results in improved photochromic properties. Photochromic phosphole- and silole-fused diarylethene-based materials feature excellent thermal irreversibility at high temperature up to 100° C. with insignificant thermal backward reaction over a long period of time, robust fatigue resistance with negligible photodegradation over ten photoswitching cycles under ambient condition, as well as relatively high photocyclization/photocycloreversion quantum yields. More importantly, the photochromic phospholes and siloles shows comparable photochromic performance to that of the conventional perfluorocyclopentene-fused diarylethenes and are superior to other heterocycle-fused diarylethenes. These weakly aromatic heterocycle-fused diarylethenes have been regarded as one of the most promising candidates of photochromic materials for potential practical applications.

The exploration of metalloles, which are five-membered heterocyclic derivatives of cyclopentadiene, with heavy congeners of higher than 2p and more recently 3p main group elements has been extremely rare, despite the decreasing aromaticity exhibited by heavier congeners. This is possibly due to limited preparation methods available for synthesis of these interesting heterocycles with unique electronic and photophysical properties. Although the use of heterocycles as the "ethene" bridge of the diarylethene backbone, rather than simple modification on the pendant groups of the perfluorocyclopentene-based diarylethene, offers interesting photocontrolled functions and enriched photochromic properties, only the 3p silicon and phosphorus atoms in siloles and phospholes have been examined for functionalized metalloles. To this end, a class of photochromic diarylethene-based compounds where the "ethene" part of the backbone is fused with germanium-containing heterocycles where exploitation of a weak aromaticity, is of interest for their potential for tunable photophysical properties of the photogenerated closed form with good thermal irreversibility and fatigue resistance.

BRIEF SUMMARY OF THE INVENTION

Embodiments are directed to germole-fused diarylethene-based compounds, comprising at least one germanium-containing five-membered ring structure with an ethene bridge fused to photoactive bis-aryl rings, the germanium-containing five-membered ring structure with the ethene bridge fused to photoactive bis-aryl rings having the structure of formula (I):

where: A is a mono- or polycyclic ring fused to the germanium-containing five-membered ring or is a pair of R" substituents where A is unsubstituted, monosubstituted, or plurally independently substituted 5- or 6-membered arene, heteroacene or heterocycle; R, R', R" and substituents on A are independently an alkyl, alkenyl, alkynyl, alkylaryl, cycloalkyl, haloformyl, hydroxyl, aldehyde, carboxamide, amino, alkoxy, azo, benzyl, carbonate ester, carboxylate, carboxyl, ketoamine, isocyanate, isocyanide, isothiocyanate, nitrile, nitro, nitroso, phosphine, phosphate, phosphono, pyridyl, silyl, sulfonyl, sulfo, sulfinyl, sulfhydryl, halo, aryl, substituted aryl, heteroaryl, substituted heteroaryl or a heterocyclic group; and B and C are the same or different and independently have the structure of formula (II) or formula (III):

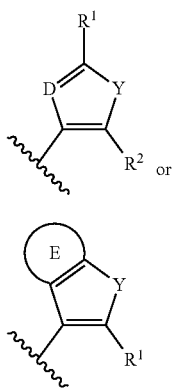

where: D is C—R³ or N; R¹, R² and R³ are independently selected from hydrogen, halogen, hydroxyl, alkyl, alkynyl, alkoxy, cyano, nitro group, alkylcarbonyl, alkoxycarbonyl, perfluoroalkyl, aryl, substituted aryl, heteroaryl, substituted heteroaryl, heterocyclic, cycloalkyl, arylcarbonyl, aryloxycarbonyl, diarylamino, dialkylamino, mono- or dialkylaminocarbonyl, alkylcaronyloxy, arylcarbonyloxy, aryloxy, alkoxycarbonyl, and aryloxycarbonyloxy; Y is S, $SO_2$, O, Se, Te and $NR^4$, where $R^4$ is hydrogen or an unsubstituted or a substituted alkyl, aryl or cycloalkyl; and E is an unsubstituted, monosubstituted, or plurally substituted 5- or 6-membered arene, heteroacene or heterocycle; and substituents on R¹, R², R³, R⁴, and E are selected from alkyl, alkenyl, alkynyl, alkylaryl, cycloalkyl, haloformyl, hydroxyl, aldehyde, carboxamide, amino, alkoxy, azo, benzyl, carbonate ester, carboxylate, carboxyl, ketoamine, isocyanate, isocyanide, isothiocyanate, nitrile, nitro, nitroso, phosphine, phosphate, phosphono, pyridyl, silyl, sulfonyl, sulfo, sulfinyl, sulfhydryl, halo, aryl, substituted aryl, heteroaryl, substituted heteroaryl and heterocyclic groups.

The mono- or polycyclic ring A can be selected from benzene, pyridine, thiophene, furan, pyrazole, imidazole, oxazole, isoxazole, thiazole, isothiazole, isoquioline, pyrrole, pyrazine, pyridazine, pyrimidine, benzimidazole, benzofuran, benzothiazole, indole, naphthalene, anthracene, pyrene, triazole, tetrazole, pyran, thiapyran, oxadiazole, triazine, tetrazine, carbazole, dibenzothiophene, dibenzofuran, and fluorene and ring E can be selected from benzene, pyridine, thiophene, furan, pyrazole, imidazole, oxazole, isoxazole, thiazole, isothiazole, isoquioline, pyrrole, pyrazine, pyridazine, pyrimidine, benzimidazole, benzofuran, benzothiazole, indole, naphthalene, anthracene, pyrene, triazole, tetrazole, pyran, thiapyran, oxadiazole, triazine, tetrazine, carbazole, dibenzothiophene, dibenzofuran, and fluorene. When the B and C structures are different, the germole-fused diarylethene-based compound can comprise a mixture of germole-fused diarylethene-based compounds where B and C of one component in the mixture has the structure of C and B, respectively, of the other component.

In another embodiment, a preparative method for synthesizing the germole-fused diarylethene-based compounds, comprises combining a 1-germyl-aryl-2-boronic ester, 1-germyl-heteroaryl-2-boronic ester, or 1-germyl-alkenyl-2-boronic ester with a 1,2-diarylethyne in the presence of a rhodium comprising catalyst. The rhodium comprising catalyst can be used in the presence of a nucleophilic tertiary amine, such a DABCO.

Another embodiment of the invention is directed to a device comprising the germole-fused diarylethene-based compound. The device can be an optical recording device or a photoswitchable molecular device.

DETAILED DISCLOSURE OF THE INVENTION

Figure 1:
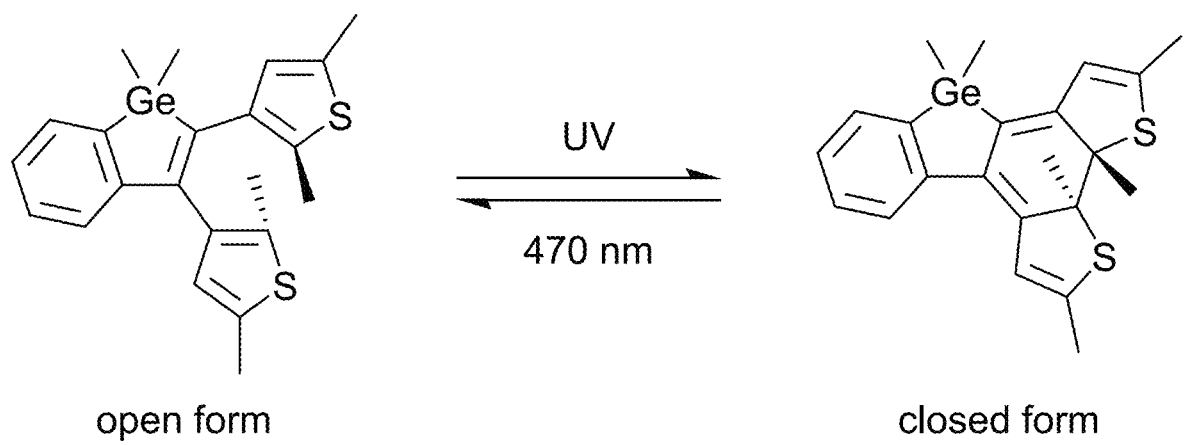
FIG. 1 shows structural changes for the photochromic reaction of 1.

Embodiments of the invention are directed to novel photochromic heterocyclic compounds, the compounds' preparation, and devices including these compounds for use of a compound's photochromic properties. The photochromic compounds are based on diarylethene structures where a germanium-containing heterocyclic ring is directly connected to photoactive diaryl units. Devices according to embodiments include these compounds as a photochromic layer in an optical recording material or other photoswitchable molecular devices. The photochromic heterocyclic compounds have a structure that modulates the photophysical and photochromic behaviors of diarylethene-based materials. The weakly aromatic germole ring's participation in the photochromic reactions allows this class of germole-fused diarylethene-based compounds to display useful photochromic properties with excellent thermal irreversibility, robust fatigue resistance, and tunable absorption maxima of the photogenerated closed form for practical application of optical recording and photoswitchable molecular devices.

Embodiments are directed to photochromic germole-fused diarylethene-based compounds that display photochromism with tunable colors in their photogenerated closed form. The germole-fused diarylethene-based compounds have the chemical structure of formula (I):

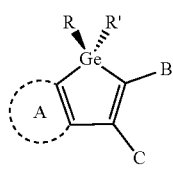

where: A is a fused mono- or polycyclic ring to the germole ring or a pair of R" substituents; B and C are heterocyclic groups capable of undergoing a ring-closing reaction upon photoirradiation to a closed form comprising a fused 6-membered ring to the germole ring; and R, R', and R" are independently an alkyl, alkenyl, alkynyl, alkylaryl, cycloalkyl, haloformyl, hydroxyl, aldehyde, carboxamide, amino, alkoxy, azo, benzyl, carbonate ester, carboxylate, carboxyl, ketoamine, isocyanate, isocyanide, isothiocyanate, nitrile, nitro, nitroso, phosphine, phosphate, phosphono, pyridyl, silyl, sulfonyl, sulfo, sulfinyl, sulfhydryl, halo, aryl, substituted aryl, heteroaryl, substituted heteroaryl or a heterocyclic group.

Fused mono- or polycyclic ring A is an unsubstituted, monosubstituted, or plurally independently substituted 5- or 6-membered arene, heteroacene or heterocycle. The arene, heteroacene or heterocycle can be selected from benzene, pyridine, thiophene, furan, pyrazole, imidazole, oxazole, isoxazole, thiazole, isothiazole, isoquioline, pyrrole, pyrazine, pyridazine, pyrimidine, benzimidazole, benzofuran, benzothiazole, indole, naphthalene, anthracene, pyrene, triazole, tetrazole, pyran, thiapyran, oxadiazole, triazine, tetrazine, carbazole, dibenzothiophene, dibenzofuran, fluorene, or derivatives thereof. Substituents on mono- or polycyclic ring A are independently selected from alkyl, alkenyl, alkynyl, alkylaryl, cycloalkyl, haloformyl, hydroxyl, aldehyde, carboxamide, amino, alkoxy, azo, benzyl, carbonate ester, carboxylate, carboxyl, ketoamine, isocyanate, isocyanide, isothiocyanate, nitrile, nitro, nitroso, phosphine, phosphate, phosphono, pyridyl, silyl, sulfonyl, sulfo, sulfinyl, sulfhydryl, halo, aryl, substituted aryl, heteroaryl, substituted heteroaryl or heterocyclic groups.

B and C are the same or different and independently have the structure of formula (II) or formula (III):

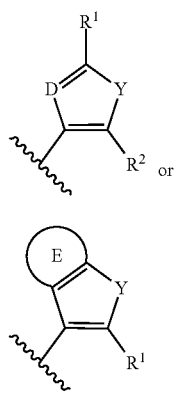

where: D is C—$R^3$ or N; $R^1$, $R^2$ and $R^3$ are independently selected from hydrogen, halogen, hydroxyl, alkyl, alkynyl, alkoxy, cyano, nitro group, alkylcarbonyl, alkoxycarbonyl, perfluoroalkyl, aryl, substituted aryl, heteroaryl, substituted heteroaryl, heterocyclic, cycloalkyl, arylcarbonyl, aryloxycarbonyl, diarylamino, dialkylamino, mono- or dialkylaminocarbonyl, alkylcaronyloxy, arylcarbonyloxy, aryloxy, alkoxycarbonyl, and aryloxycarbonyloxy; Y comprises S, $SO_2$, O, Se, Te and $NR^4$, where $R^4$ is hydrogen or an unsubstituted or a substituted alkyl, aryl or cycloalkyl; and ring E is an unsubstituted, monosubstituted, or plurally substituted 5- or 6-membered arene, heteroacene or heterocycle selected from benzene, pyridine, thiophene, furan, pyrazole, imidazole, oxazole, isoxazole, thiazole, isothiazole, isoquioline, pyrrole, pyrazine, pyridazine, pyrimidine, benzimidazole, benzofuran, benzothiazole, indole, naphthalene, anthracene, pyrene, triazole, tetrazole, pyran, thiapyran, oxadiazole, triazine, tetrazine, carbazole, dibenzothiophene, dibenzofuran, fluorene, or derivatives thereof, where independently substituents on $R^1$, $R^2$, $R^3$, $R^4$, and ring E are selected from alkyl, alkenyl, alkynyl, alkylaryl, cycloalkyl, haloformyl, hydroxyl, aldehyde, carboxamide, amino, alkoxy, azo, benzyl, carbonate ester, carboxylate, carboxyl, ketoamine, isocyanate, isocyanide, isothiocyanate, nitrile, nitro, nitroso, phosphine, phosphate, phosphono, pyridyl, silyl, sulfonyl, sulfo, sulfinyl, sulfhydryl, halo, aryl, substituted aryl, heteroaryl, substituted heteroaryl or heterocyclic groups.

Exemplary, but not limiting, germole-fused diarylethene-based compounds of formula (I) can have the structures:

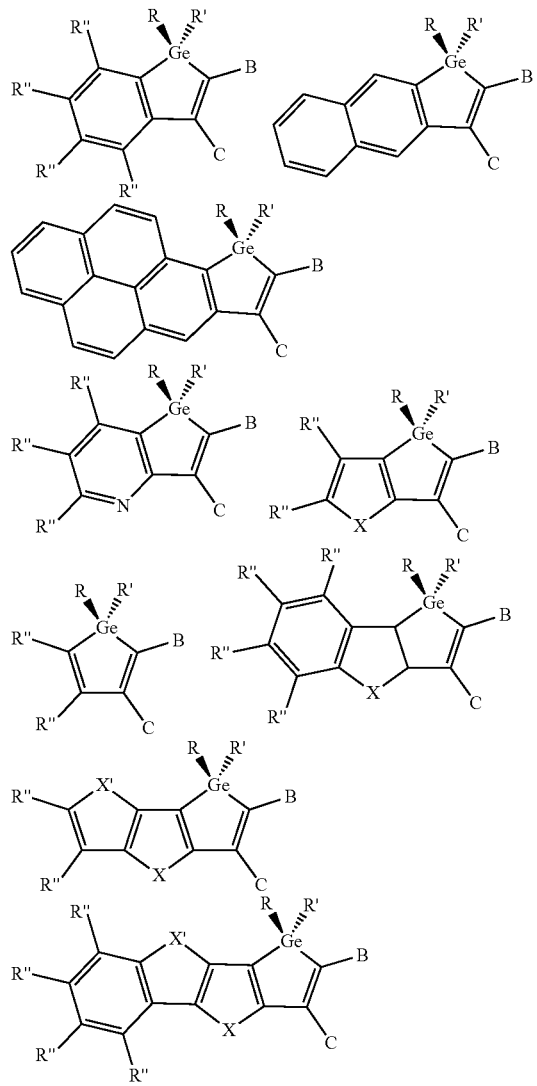

where X and X' are heteroatoms, independently selected from S, $SO_2$, O, Se and NR''', where R''' is alkyl, alkenyl, alkylaryl, cycloalkyl, haloformyl, hydroxyl, aldehyde, carboxamide, amino, alkoxy, azo, benzyl, carbonate ester, carboxylate, carboxyl, ketamine, isocyanate, isocyanide, isothiocyanate, nitrile, nitro, nitroso, phosphine, phosphate, phosphono, pyridyl, silyl, sulfonyl, sulfo, sulfinyl, sulfhydryl, halo, aryl, substituted aryl, heteroaryl, substituted heteroaryl or a heterocyclic group.

Non-limiting examples of formula (II) and (III) can be:

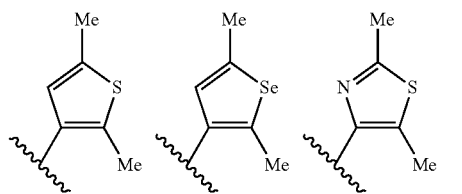

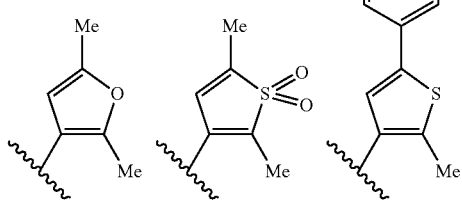

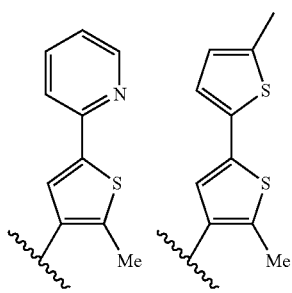

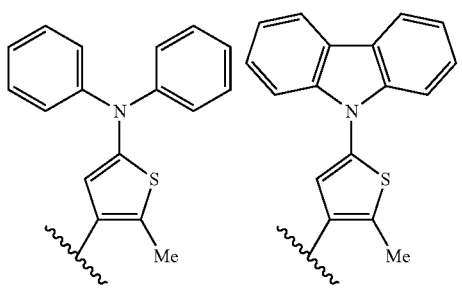

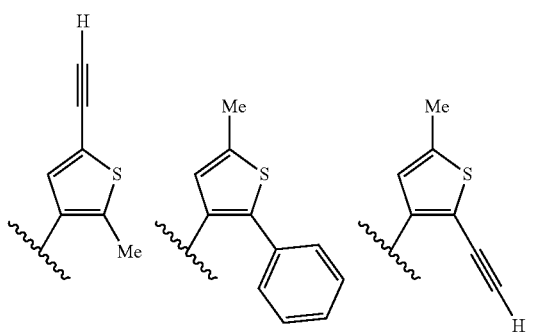

-continued

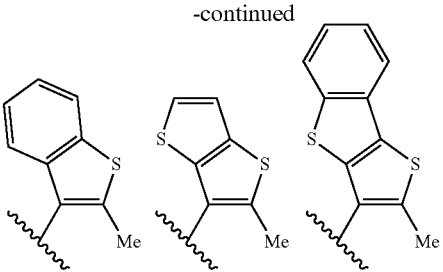

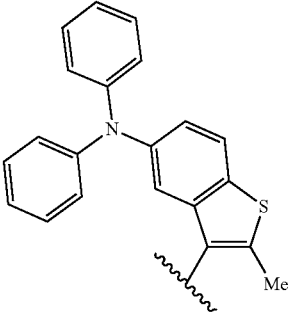

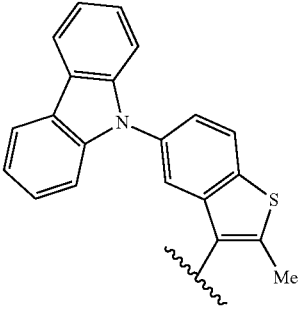

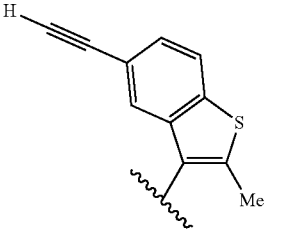

It is understood that changes and variations can be made to these germole-fused diarylethene-based compounds without deviating from the scope and the spirit for their intended use. It is also understood that various theories as to why the invention works are not intended to be limiting. Although the compounds described herein are representative monomeric structure. As is well known to those in the art, the compounds can also be present as dimers, trimers, larger oligomers or dendrimers, where, for example, where substituents on A, B, or C can be used for subsequent coupling or polymerization in a step-growth or chain-growth process, or where germoles can be coupled through the A portion or where a diarylethene precursor to the B and C units has two or more alternating alkynyl and aryl or bis-aryl groups such that a step-growth dimerization, oligomerization, or polymerization can be carried out. Preparation of germole-fused diarylethene-containing coordination complexes is also feasible when B and C are composed of cyclic structure derivative of substituted or unsubstituted aryl heterocyclic group containing one or more donor atoms X", wherein X" is independently selected from N, O, S, Se and P, coordinating to a coordination unit $[ML_n]$, wherein n is an integer from 0 to 5, M is a metal or main group such as aluminium, zinc, gallium, indium, rhodium, manganese, nickel, iron, cobalt, copper, ruthenium, platinum, palladium, tin, vanadium, chromium, iridium, gadolinium, boron, beryllium, lanthanum, and L is a ligand can be independently alkyl, alkenyl, alkylaryl, cycloalkyl, haloformyl, hydroxyl, aldehyde, carboxamide, amino, alkoxy, azo, benzyl, carbonate ester, carboxylate, carboxyl, ketamine, isocyanate, isocyanide, isothiocyanate, nitrile, nitro, nitroso, phosphine, phosphate, phosphono, pyridyl, silyl, sulfonyl, sulfo, sulfinyl, sulfhydryl, halo, aryl, substituted aryl, heteroaryl, substituted heteroaryl or a heterocyclic group, and a cyclometalating bidentate ligand with donor atoms independently selected from C, N, O, S, Se and P, which can be, but not limited to, 2-phenylpyridine, phenylisoquinoline, phenylquinoline, phenylpyrazole, 7,8-benzoquinolines, 1-phenylimidazol-2-ylidene and derivatives thereof, and a tridentate ligand with donor atoms independently selected from C, N, O, S, Se and P, which can be, but not limited to 2,6-diphenylpyridine, 1,3-di(2-pyridyl)benzene, 1,3-bis(benzimidazol-2'-yl)benzene, 2-(biphenyl-3-yl)pyridine, 6-phenyl-2,2'-bipyridine, 1,3-di(imidazol-2-yliden-1-yl)benzene and derivatives thereof, and a tetradentate ligand with donor atoms independently selected from C, N, O, S, Se and P, which can be, but not limited to, 6,6-diphenyl-2,2'-bipyridine, 2,2'-(oxybis(3,1-phenylene))dipyridine and derivatives thereof, as well as a non-cyclometalating bidentate ligand with donor atoms independently selected from N, O, S, Se and P, which can be, but not limited to, ethylenediamine, 2,2'-bipyridine, 1,10-phenanothroline, 1,2-bis(diphenylphosphino)ethane, (2,2'-bis(diphenylphosphino)-1,1'-binaphthyl), oxalate, acetylacetonate, 9-hydroxy-1H-phenalen-1-one, 8-hydroxyquinoline and derivatives thereof, and a non-cyclometalating tridentate ligand with donor atoms independently selected from N, O, S, Se and P, which can be, but not limited to, 2,2':6',2''-terpyridine, 2,6-bis(benzimidazole-2'-yl)pyridine, 2,6-bis(1,2,3-triazol-4-yl)pyridine, subphthalocyanine and derivatives thereof, and a non-cyclometalating tetradentate ligand with donor atoms independently selected from N, O, S, Se and P, which can be, but not limited to, triethylenetetramine, 2,2':6',2:6,2'''-quaterpyridine, N,N'-bis(salicylidene)ethylenediamine, porphyrin and derivatives thereof.

In embodiments, the germole-fused diarylethene-based compound is prepared by a synthetic method that employs a rhodium-catalyzed intermolecular coupling reaction of a 1-germyl-aryl-2-boronic ester, 1-germyl-heteroaryl-2-boronic ester, or a 1-germyl-alkenyl-2-boronic ester with a 1,2-diarylethyne. The 1-germyl-aryl-2-boronic ester, 1-germyl-heteroaryl-2-boronic ester, or a 1-germyl-alkenyl-2-boronic ester can be prepared by the reaction of trimethylgermanium chloride with a lithiated aromatic halide, lithiated alkenyl halide, or lithiated heteroaromatic followed by reaction with a trialkylborate, such as trimethylborate, hydrolyzed to the boronic acid, and esterified with a glycol, such as neopentyl glycol, to yield the 1-germyl-aryl-2-boronic ester, 1-germyl-heteroaryl-2-boronic ester, or a 1-germyl-alkenyl-2-boronic ester. Coupling is carried out with a rhodium catalyst that can be, but is not limited to, chloro(1,5-cyclooctadiene)rhodium(I) dimer, [RhCl(COD)]$_2$, in the presence of 1,4-diazabicyclo[2.2.2]octane (DABCO), or another nucleophilic tertiary amine, to yield the germole-fused diarylethene-based compound. The two aryl groups of the 1,2-diarylethyne can be the same or different and provide groups B and C of Formula (I).

In embodiments, the germole-fused diarylethene-based compounds are used to provide the photochromic component, such as, but not limited to, a layer as an optical recording material or other photoswitchable molecular devices. The modulating photochromic behavior is provided by the weakly aromatic germole ring's participation in the photochromic reactions that allows the germole-fused diarylethene-based compounds to be used for their excellent photochromic properties because of their thermal irreversibility coupled with a robust fatigue resistance. The choice of the A, B, and C groups allows the tuning of the absorption maxima of the photogenerated closed form to allow their practical application as switchable molecules on photonic devices.

Following are examples that illustrate procedures for practicing embodiments of the invention. These examples should not be construed as limiting. All percentages are by weight and all solvent mixture proportions are by volume unless otherwise noted.

Materials and Methods

Example 1—Synthesis of Photochromic Germoles 1-8

The germole-containing heterocyclic ring structures are prepared by the rhodium-catalyzed intermolecular coupling reaction of 1-germyl-aryl-2-boronic ester with an alkyne. The photochromic diarylethene-based moieties are introduced using their corresponding intermediates such as 1,2-diarylethyne for the rhodium-catalyzed intermolecular coupling reaction with 2-germylarylboronic esters for the construction of germole-containing heterocyclic ring structures, to offer the targeted photochromic compounds. Scheme 1 shows the synthetic preparation of photochromic germoles 1-4, having various photoactive bis-aryl pendant groups. Scheme 2 displays the synthetic preparation method of photochromic germoles 5 and 6 with the substituents on the backbone. Scheme 3 illustrates the synthetic preparation of photochromic germoles 7 and 8 with incorporation of π-conjugated system fused with the germole-containing backbone.

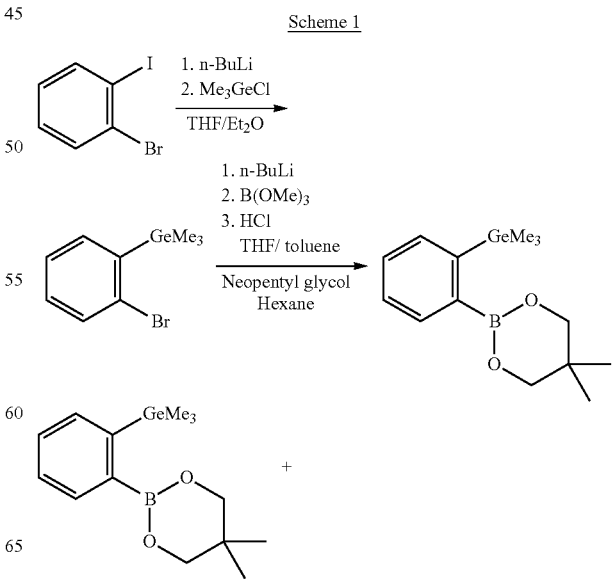

-continued
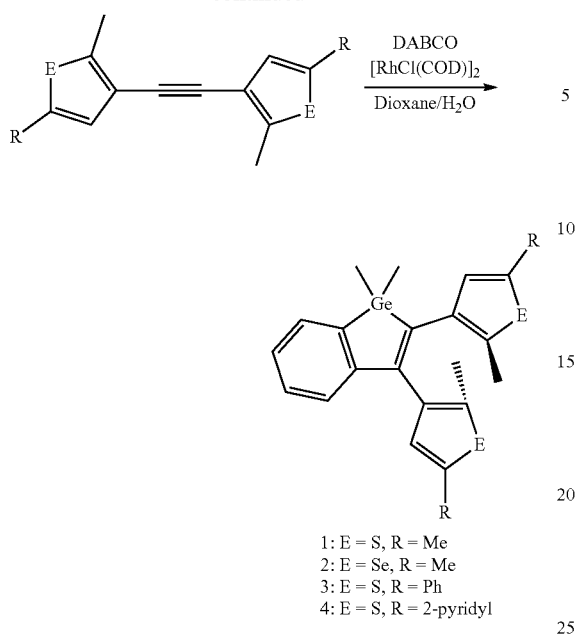
1: E = S, R = Me
2: E = Se, R = Me
3: E = S, R = Ph
4: E = S, R = 2-pyridyl
Scheme 2
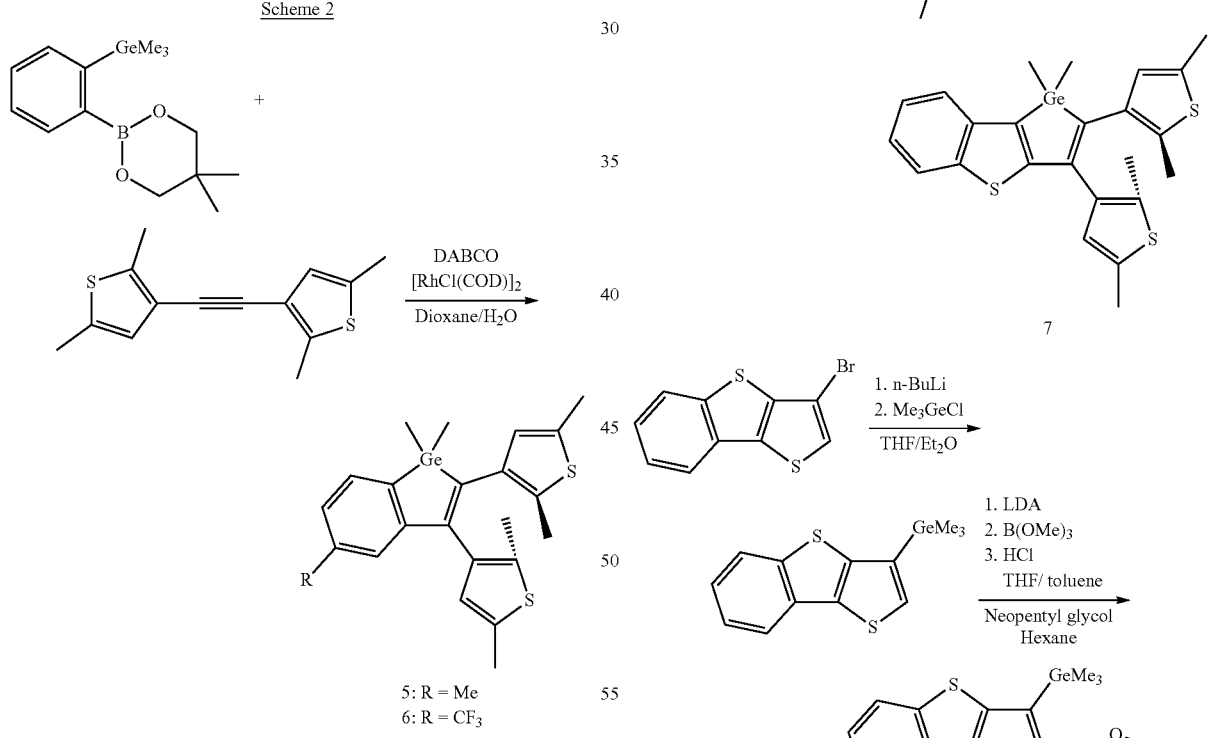
5: R = Me
6: R = CF₃
Scheme 3
-continued
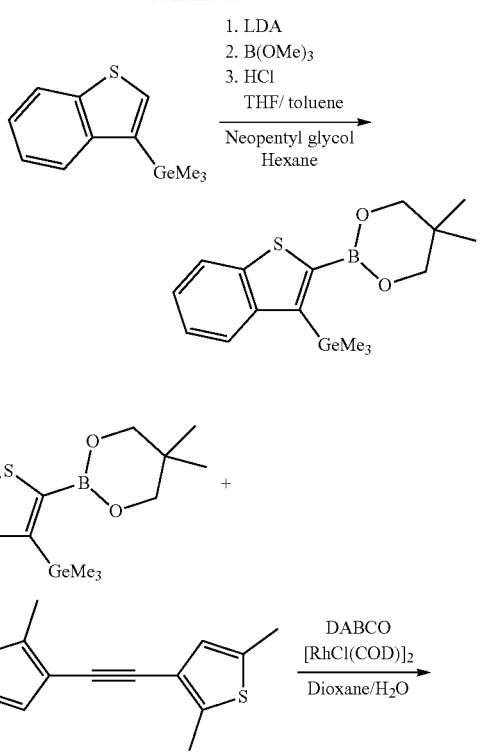
7

-continued

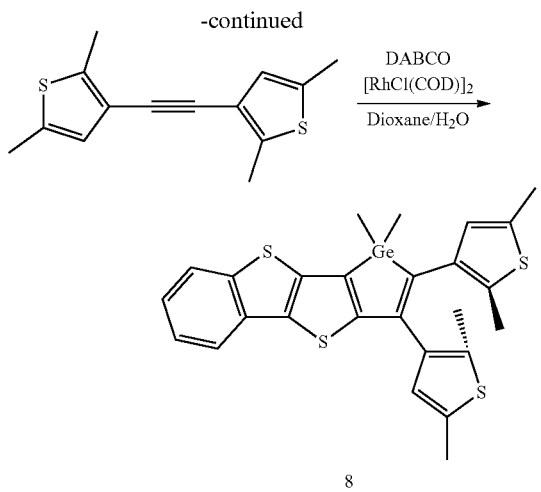

8

The compounds display photochromic properties with excellent thermal irreversibility, robust fatigue resistance, and tunable absorption maxima of the photogenerated closed form for potential practical application of optical recording and photoswitchable molecular devices. Structural characterization and spectroscopic properties of compounds 1-8 are as below:

Compound 1 [BzGeMe$_2$-DThE] Yield: 43%. $^1$H NMR (500 MHz, CDCl$_3$, 298 K, δ/ppm): δ 0.49 (s, 3H, —GeCH$_3$), 0.63 (s, 3H, —GeCH$_3$), 1.91 (s, 3H, —CH$_3$), 1.93 (s, 3H, —CH$_3$), 2.33 (s, 3H, —CH$_3$), 2.39 (s, 3H, —CH$_3$), 6.27 (s, 1H, thienyl), 6.45 (s, 1H, thienyl), 7.15-7.17 (m, 1H, phenyl), 7.21-7.30 (m, 2H, phenyl), 7.56-7.58 (m, 1H, phenyl). HRMS (Positive ESI) calcd for C$_{22}$H$_{24}$GeS$_2$ m/z=426.0528; found 426.0505. [M]$^+$. Elemental analyses calcd (%) for C$_{22}$H$_{24}$GeS$_2$: C, 62.15, H, 5.69; found (%): C, 61.94, H, 5.73.

Compound 2 [BzGeMe$_2$-DSeE] Yield: 46%. $^1$H NMR (500 MHz, CDCl$_3$, 298 K, δ/ppm): δ 0.49 (s, 3H, —GeCH$_3$), 0.62 (s, 3H, —GeCH$_3$), 2.03 (s, 3H, —CH$_3$), 2.05 (s, 3H, —CH$_3$), 2.43 (s, 3H, —CH$_3$), 2.47 (s, 3H, —CH$_3$), 6.45 (s, 1H, thienyl), 6.59 (s, 1H, thienyl), 7.14-7.15 (m, 1H, phenyl), 7.22-7.23 (m, 1H, phenyl), 7.28-7.30 (m, 1H, phenyl), 7.56-7.57 (m, 1H, phenyl). HRMS (Positive ESI) calcd for C$_{22}$H$_{24}$GeSe$_2$ m/z=518.9523; found 518.9509. [M]+. Elemental analyses calcd (%) for C$_{22}$H$_{24}$GeSe$_2$: C, 50.91, H, 4.66; found (%): C, 51.09, H, 4.70.

Compound 3 [BzGeMe$_2$-DThE-Ph] Yield: 51%. $^1$H NMR (500 MHz, CDCl$_3$, 298 K, δ/ppm): δ 0.56 (s, 3H, —GeCH$_3$), 0.71 (s, 3H, —GeCH$_3$), 2.09 (s, 3H, —CH$_3$), 2.10 (s, 3H, —CH$_3$), 6.92 (s, 1H, thienyl), 7.14 (s, 1H, thienyl), 7.26-7.19 (m, 3H, phenyl), 7.36-7.26 (m, 6H, phenyl), 7.47 (d, J=7.6 Hz, 2H, phenyl), 7.53 (d, J=7.6 Hz, 2H, phenyl), 7.64 (d, J=6.6 Hz, 1H, phenyl). HRMS (Positive ESI) calcd for C$_{32}$H$_{28}$GeS$_2$: m/z=550.0838; found: m/z=550.0843 [M+H]$^+$. Elemental analyses calcd (%) for C$_{32}$H$_{28}$GeS$_2$: C, 69.97, H, 5.14; found (%): C, 69.69, H, 5.09.

Compound 4 [BzGeMe$_2$-DThE-Py] Yield: 40%. $^1$H NMR (500 MHz, CDCl$_3$, 298 K, δ/ppm): δ 0.57 (s, 3H, —GeCH$_3$), 0.71 (s, 3H, —GeCH$_3$), 2.11 (s, 3H, —CH$_3$), 2.12 (s, 3H, —CH$_3$), 7.12-7.06 (m, 2H, pyridyl), 7.19-7.17 (m, 2H, thienyl), 7.32-7.26 (m, 2H, phenyl), 7.38 (s, 1H, thienyl), 7.49 (d, J=8.1 Hz, 1H, pyridyl), 7.55 (d, J=8.1 Hz, 1H, pyridyl), 7.65-7.59 (m, 3H, pyridyl, phenyl), 8.45 (d, J=4.8 Hz, 1H, pyridyl), 8.48 (d, J=4.8 Hz, 1H, pyridyl). HRMS (Positive ESI) calcd for C$_{30}$H$_{26}$GeN$_2$S$_2$: m/z=552.0854; found: m/z=552.0854 [M+H]$^+$. Elemental analyses calcd (%) for C$_{30}$H$_{26}$GeN$_2$S$_2$: C, 65.36, H, 4.75, N, 5.08; found (%): C, 65.24, H, 4.74, N, 5.06.

Compound 5 [MeBzGeMe$_2$-DThE] Yield: 50%. $^1$H NMR (500 MHz, CDCl$_3$, 298 K, δ/ppm): δ 0.47 (s, 3H, —GeCH$_3$), 0.61 (s, 3H, —GeCH$_3$), 1.90 (s, 3H, —CH$_3$), 1.93 (s, 3H, —CH$_3$), 2.31 (s, 3H, —CH$_3$), 2.34 (s, 3H, —CH$_3$), 2.41 (s, 3H, —CH$_3$), 6.25 (s, 1H, thienyl), 6.45 (s, 1H, thienyl), 6.98 (s, 1H, phenyl), 7.08 (d, J=7.1 Hz, 1H, phenyl), 7.47 (d, J=7.10 Hz, 1H, phenyl). HRMS (Positive ESI) calcd for C$_{23}$H$_{26}$GeS$_2$: m/z=441.0760; found: m/z=441.0761 [M+H]$^+$. Elemental analyses calcd (%) for C$_{23}$H$_{26}$GeS$_2$: C, 62.90, H, 5.97; found (%): C, 63.04, H, 5.97.

Compound 6 [CF$_3$BzGeMe$_2$-DThE] Yield: 56%. $^1$H NMR (500 MHz, CDCl$_3$, 298 K, δ/ppm): δ 0.47 (s, 3H, —GeCH$_3$), 0.61 (s, 3H, —GeCH$_3$), 1.90 (s, 3H, —CH$_3$), 1.93 (s, 3H, —CH$_3$), 2.31 (s, 3H, —CH$_3$), 2.34 (s, 3H, —CH$_3$), 2.41 (s, 3H, —CH$_3$), 6.25 (s, 1H, thienyl), 6.45 (s, 1H, thienyl), 6.98 (s, 1H, phenyl), 7.08 (d, J=7.1 Hz, 1H, benzo), 7.47 (d, J=7.1 Hz, 1H, phenyl). $^{19}$F{$^1$H} NMR (470.5 MHz, CDCl$_3$, 298 K): δ −62.53 HRMS (Positive ESI) calcd for C$_{23}$H$_{23}$F$_3$GeS$_2$: m/z=495.0477; found: m/z=495.0250 [M+H]+. Elemental analyses calcd (%) for C$_{23}$H$_{23}$F$_3$GeS$_2$: C, 56.01, H, 4.70; found (%): C, 56.08, H, 4.69.

Compound 7 [BzThGeMe$_2$-DThE] Yield: 55%. $^1$H NMR (500 MHz, CDCl$_3$, 298 K, δ/ppm): δ 0.59 (s, 3H, —GeCH$_3$), 0.77 (s, 3H, —GeCH$_3$), 1.90 (s, 3H, —CH$_3$), 1.95 (s, 3H, —CH$_3$), 2.36 (s, 3H, —CH$_3$), 2.44 (s, 3H, —CH$_3$), 6.34 (s, 1H, thienyl), 6.71 (s, 1H, thienyl), 7.23 (t, J=7.6 Hz, 1H, phenyl), 7.34 (t, J=7.6 Hz, 1H, phenyl), 7.70 (d, J=8.0 Hz, 1H, phenyl), 7.82 (d, J=8.0 Hz, 1H, phenyl). HRMS (Positive ESI) calcd for C$_{24}$H$_{24}$GeS$_3$: m/z=483.0324; found: m/z=483.0538 [M+H]$^+$. Elemental analyses calcd (%) for C$_{24}$H$_{24}$GeS$_3$: C, 59.90, H, 5.03; found (%): C, 60.01, H, 5.03.

Compound 8 [BzThThGeMe$_2$-DThE] Yield: 50%. $^1$H NMR (500 MHz, CDCl$_3$, 298 K, δ/ppm): δ 0.59 (s, 3H, —GeCH$_3$), 0.77 (s, 3H, —GeCH$_3$), 1.90 (s, 3H, —CH$_3$), 1.95 (s, 3H, —CH$_3$), 2.36 (s, 3H, —CH$_3$), 2.44 (s, 3H, —CH$_3$), 6.34 (s, 1H, thienyl), 6.71 (s, 1H, thienyl), 7.23 (t, J=7.8 Hz, 1H, phenyl), 7.34 (t, J=7.6 Hz, 1H, phenyl), 7.73 (d, J=7.8 Hz, 1H, phenyl), 7.82 (d, J=8.0 Hz, 1H, phenyl). HRMS (Positive ESI) calcd for C$_{26}$H$_{24}$GeS$_4$: m/z=539.0045; found: m/z=539.0032 [M+H]$^+$. Elemental analyses calcd (%) for C$_{26}$H$_{24}$GeS$_4$: C, 58.12, H, 4.50; found (%): C, 57.99, H, 4.52.

Photochromic Properties

Figure 2:
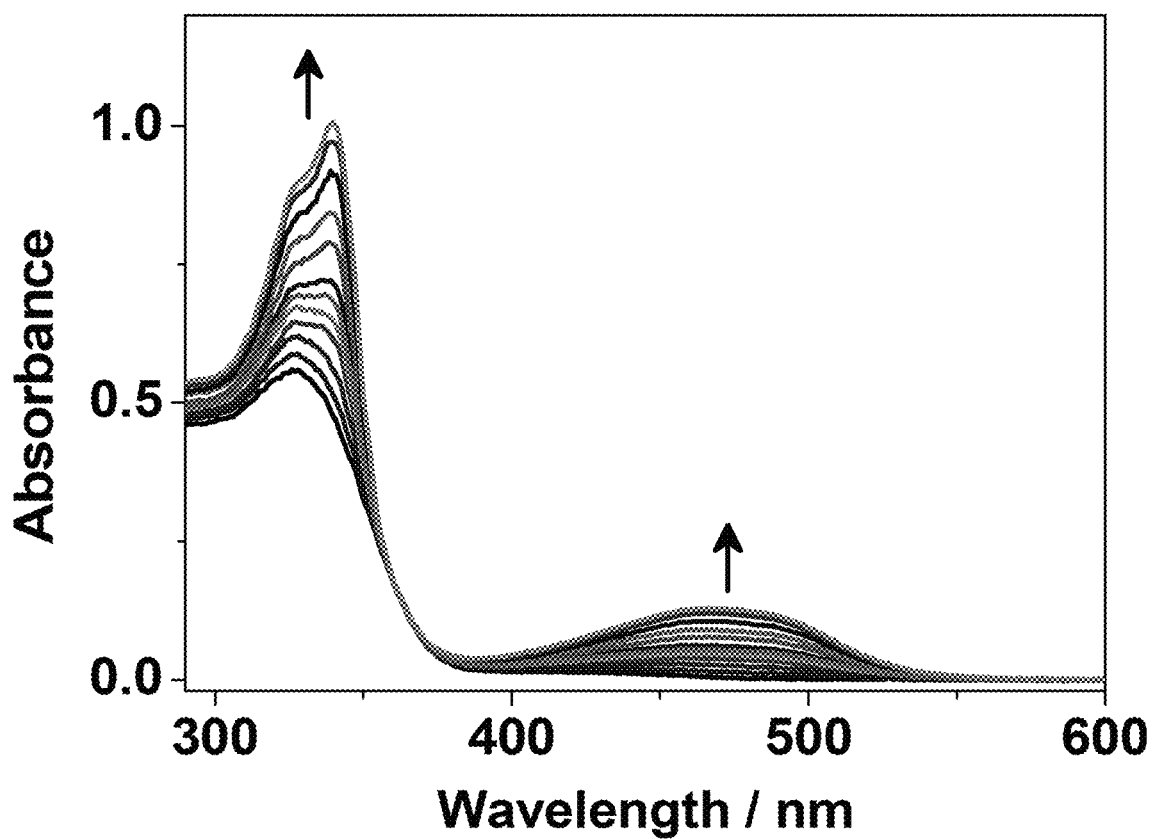
FIG. 2 shows a composite plot for UV-vis absorption spectra of 1 in degassed benzene upon photoirradiation at ca. 365 nm.
Figure 3:
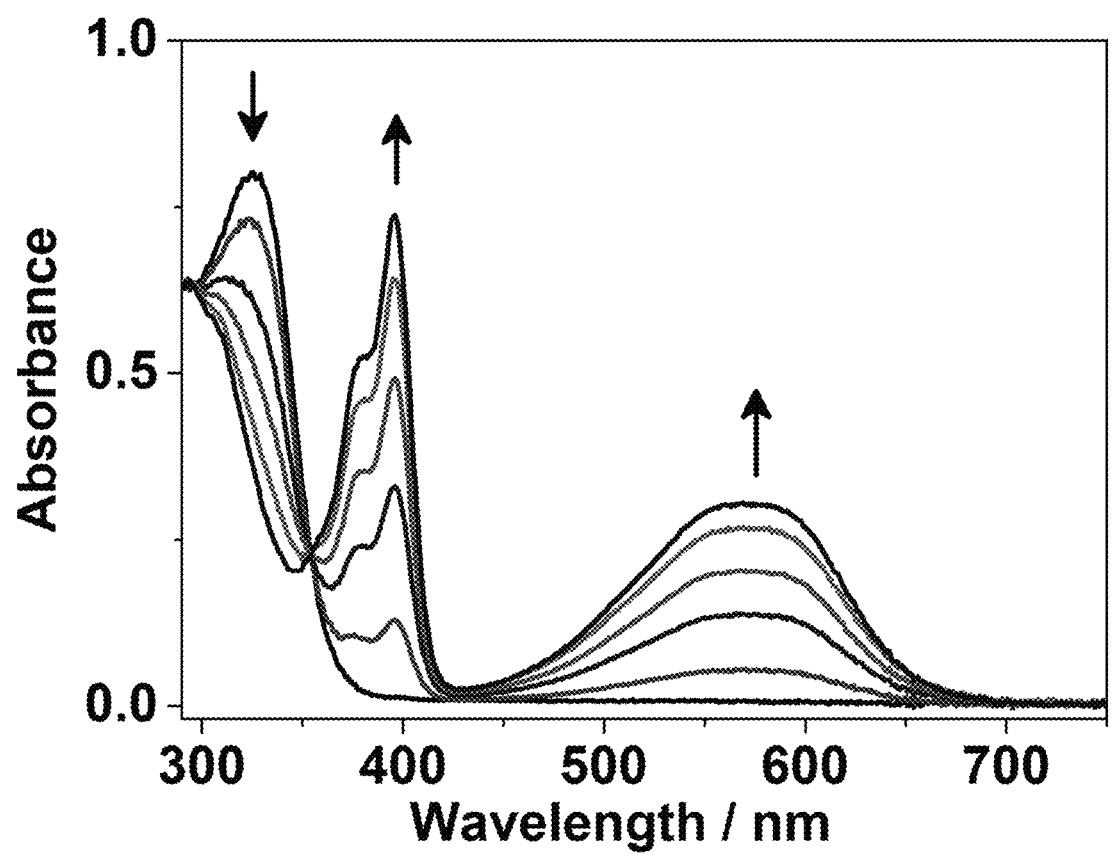
FIG. 3 shows a composite plot for UV-vis absorption spectra of 4 in degassed benzene upon photoirradiation at ca. 365 nm.
Figure 4:
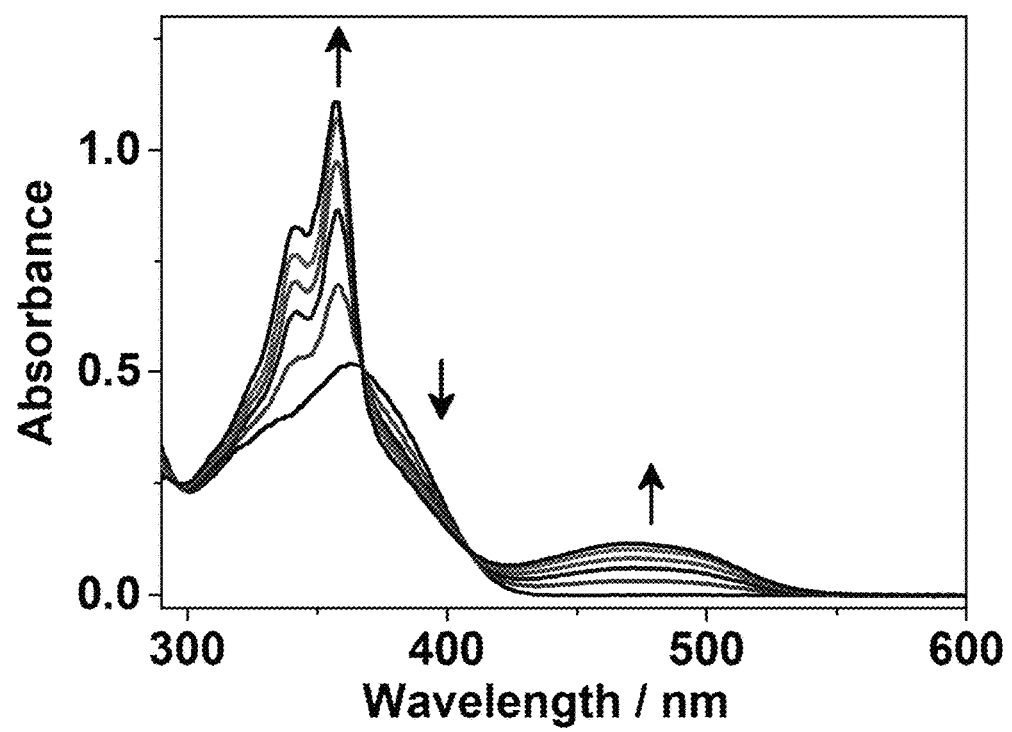
FIG. 4 shows a composite plot for UV-vis absorption spectra of 7 in degassed benzene upon photoirradiation at ca. 365 nm.
Figure 5A:
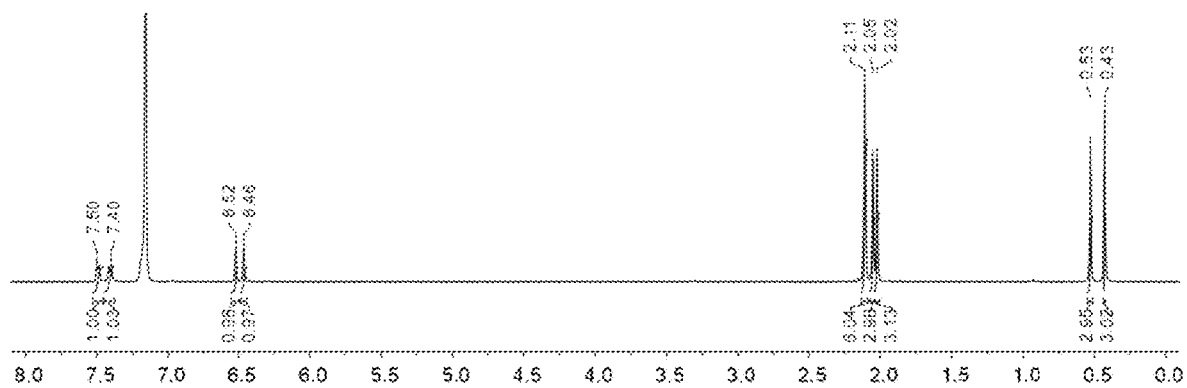
FIG. 5A shows ¹H NMR spectra of 1 ($1 \times 10^{-3}$ M, 400 MHz, 298 K) before photoirradiation.
Figure 5B:
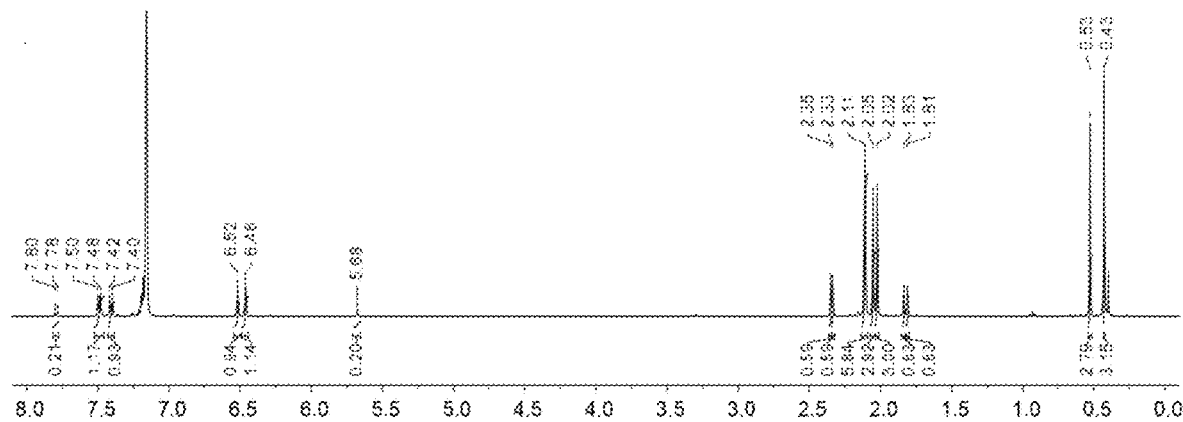
FIG. 5B shows ¹H NMR spectra of 1 ($1 \times 10^{-3}$ M, 400 MHz, 298 K) after UV excitation for photocyclization.
Figure 5C:
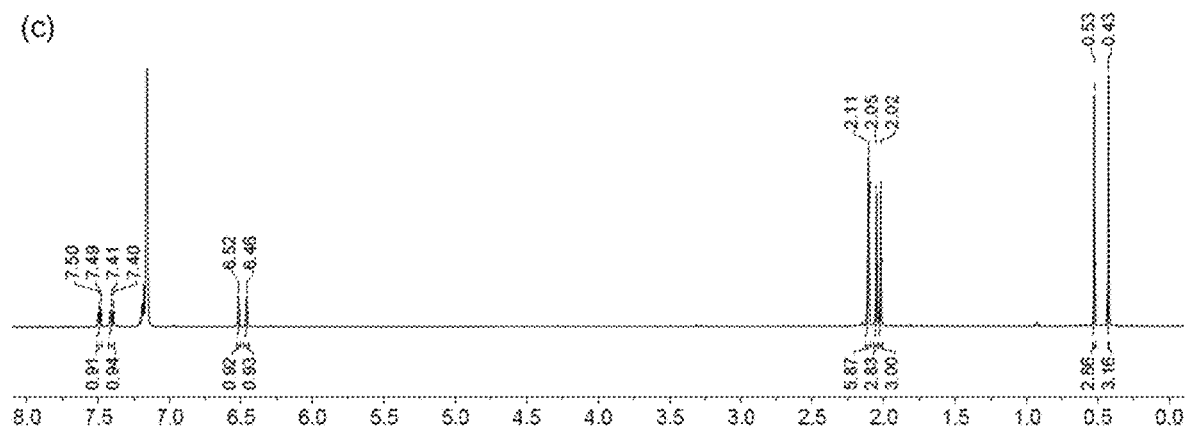
FIG. 5C shows ¹H NMR spectra of 1 ($1 \times 10^{-3}$ M, 400 MHz, 298 K) and further subjected to photoirradiation at 470 nm for photocycloreversion in $CDCl_3$.

The photochromic germoles 1-8 in degassed solution display photoinduced coloration from a colorless or pale-yellow state to a deeply colored state, which are thermally stable at 100° C. The recovery of the original state in solution can be achieved via photoinduced decoloration upon excitation of visible light. The photochromic germoles undergo reversibly repeated photoinduced coloration and decoloration. FIG. 1 shows the photochemical reactions of 1 with its structural changes during the photochromism. FIGS. 2, 3 and 4 show the UV-vis absorption spectral changes of 1, 4 and 7 in degassed benzene upon UV excitation. FIGS. 5A, 5B, and 5C show the $^1$H NMR spectral changes of 1 during photochromic reactions, involving the formation of the photogenerated closed form upon the photocyclization and the regeneration of the open form upon the photocycloreversion. Electronic absorption data of the open forms and the photogenerated closed forms are tabulated in Table 1.

TABLE 1

Electronic Absorption Data for Compounds 1-8 in Benzene at 298 K

| Compound | Configuration | Absorption $\lambda_{max}$ (nm) ($\varepsilon$/dm$^3$ mol$^{-1}$ cm$^{-1}$) |
|---|---|---|
| 1 | Open Form | 327 (7770) |
|   | Closed Form | 327 (33100), 339 (34800), 471 (4400) |
| 2 | Open Form | 331 (7260) |
|   | Closed Form | 305 (2350), 336 (25900), 472 (6040) |
| 3 | Open Form | 303 (29900) |
|   | Closed Form | 294 (32000), 382 (32700), 540 (13800) |
| 4 | Open Form | 325 (29400) |
|   | Closed Form | 294 (30900), 378 (25100), 396 (35600), 574 (14600) |
| 5 | Open Form | 326 (7960) |
|   | Closed Form | 328 (38500), 338 (36800), 473 (4980) |
| 6 | Open Form | 336 (7120) |
|   | Closed Form | 344 (24400), 480 (4260) |
| 7 | Open Form | 363 (12600) |
|   | Closed Form | 340 (51000), 358 (68500), 471 (7190) |
| 8 | Open Form | 379 (24700) |
|   | Closed Form | 359 (57200), 376 (77800), 476 (7330) |

Example 2—Thermal Behavior of Compound 1

Figure 6:
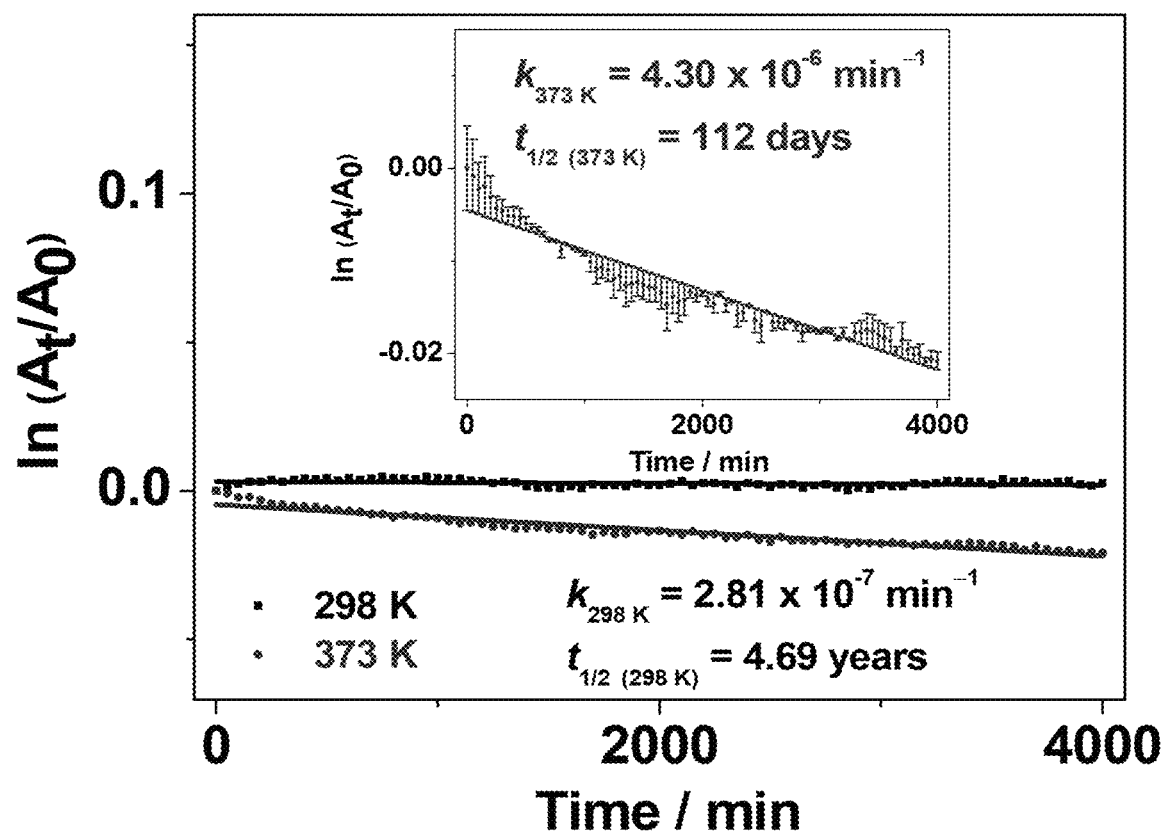
FIG. 6 shows a thermal decay plot of $\ln(A_t/A_0)$ versus time of 1 at 25 and 100° C. in nitrogen-flushed 1,2-dichlorobenzene solution, where $A_0$ and $A_t$ denote the absorbance at time zero and t, respectively, where theoretical linear fits are represented by solid lines.

Compound 1 displays excellent thermal irreversibility with less than 2% thermal backward reaction at 100° C. over 4000 minutes as shown in FIG. 6, in which the thermal decay rate constant and the half-life of the photogenerated colored state at 100° C. are determined to be $4.30 \times 10^{-6}$ min$^{-1}$ and 112 days, respectively.

Example 3—Photoswitching of Compound 1

Figure 7:
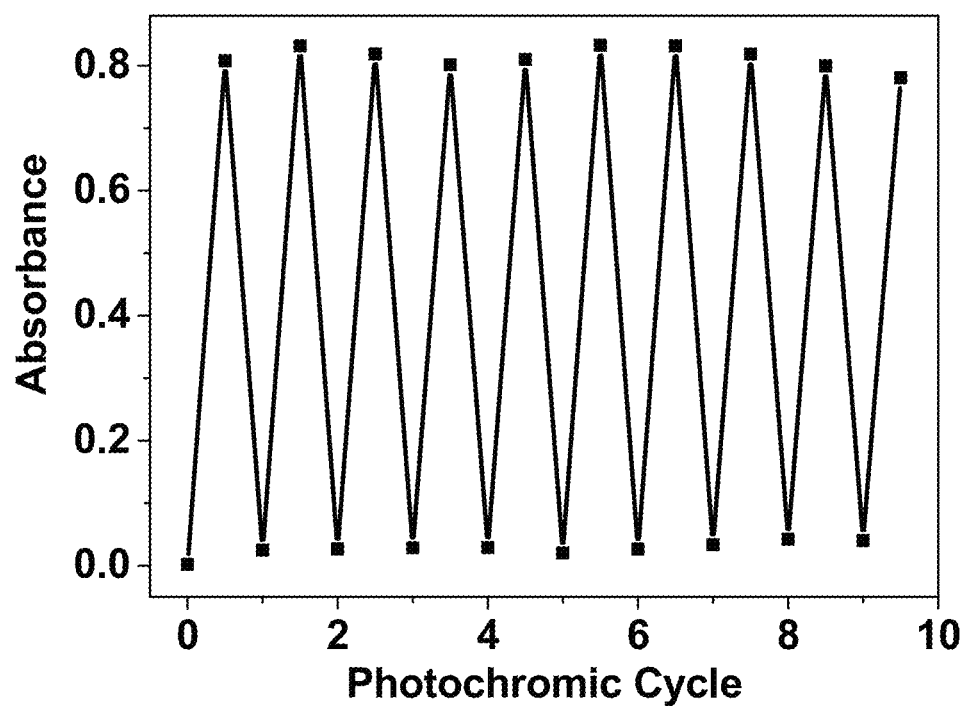
FIG. 7 shows a plot of the absorbance maxima at 470 nm of 1 in a non-degassed benzene solution under ambient conditions upon alternate photoirradiation at 365 nm and 470 nm.

As shown in FIG. 7, compound 1 displays robust fatigue resistance without any apparent loss of photochemical activity over ten photochromic cycles upon alternate excitation of UV and visible light at ca. 470 nm under ambient condition, in which the photogenerated state is able to convert completely to its original state, rendering it a photochromic material capable of repeatable color-switching.

Those skilled in the art will recognize that variations and modifications can be made in the invention without departing from the spirit and scope thereof. The various embodiments described were for the purpose of further depicting the invention and were not intended to limit it.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

Tobisu, M.; Baba, K.; Chatani, N. Org. Lett. 2011, 13, 3282-3284;

Yam, V. W.-W.; Ko, C.-C.; Zhu, N. J. Am. Chem. Soc. 2004, 126, 12734-12735;

Lee, P. H.-M.; Ko, C.-C.; Zhu, N.; Yam, V. W.-W. J. Am. Chem. Soc. 2007, 129, 6058-6059;

Yam, V. W.-W.; Lee, J. K.-W.; Ko, C.-C.; Zhu, N. J. Am. Chem. Soc. 2009, 131, 912-913;

Poon, C.-T.; Lam, W. H.; Wong, H.-L.; Yam, V. W.-W. J. Am. Chem. Soc. 2010, 132, 13992-13993;

Poon, C.-T.; Lam, W. H.; Yam, V. W.-W.; Yam, V. W.-W. J. Am. Chem. Soc. 2011, 133, 19622-19625.

Chan, J. C.-H.; Lam, W. H.; Wong, H.-L.; Zhu, N.; Wong, W.-T.; Yam, V. W.-W. J. Am. Chem. Soc. 2011, 133, 12690-12705;

Chan, J. C.-H.; Lam, W. H.; Wong, H.-L.; Wong, W.-T.; Yam, V. W.-W. Angew. Chem., Int. Ed. 2013, 52, 11504-11508.

Chan, J. C.-H.; Lam, W. H.; Yam, V. W.-W. J. Am. Chem. Soc. 2014, 136, 16994-16997;

Wu, N. M.-W.; Wong, H.-L.; Yam, V. W.-W. Chem. Sci. 2017, 8, 1309-1315;

Wu, N. M.-W.; Ng, M.; Lam, W. H.; Wong, H.-L.; Yam, V. W.-W. J. Am. Chem. Soc. 2017, 139, 15142-15150;

Wu, N. M.-W.; Ng, M.; Yam, V. W.-W. Angew. Chem., Int. Ed. 2019, 58, 3027-3031;

Wu, N. M.-W.; Yam, V. W.-W. ACS Applied Materials & Interfaces, 2019, 11, 40290-40299;

Wong, C.-L.; Ng, M.; Hong, E. Y.-H.; Wong, Y.-C.; Chan, M. Y.; Yam, V. W.-W. J. Am. Chem. Soc. 2020, 142, 12193-12206 and other research groups Zhu, W.; Yang, Y.; Métivier, R.; Zhang, Q.; Guillot, R. Xie, Y.; Tian, H.; Nakatani, K. Angew. Chem., Int. Ed. 2011, 50, 10986-10990;

Li, W.; Jiao, C.; Li, X.; Xie, Y.; Nakatani, K.; Tian, H.; Zhu, W. Angew. Chem., Int. Ed. 2014, 53, 4603-4607;

Irie, M.; Mohri, M. J. Org. Chem. 1988, 53, 803-808;

Irie, M.; Fukaminato, T.; Matsuda, K.; Kobatake, S. Chem. Rev. 2014, 114, 12174-12277; U.S. Pat. Nos. 5,175,079, 5,183,726, 5,443,940, 5,622,812, and 6,359,150;

Japanese patents JP 2-250877, JP 3-014538, JP 3-261762, JP 3-261781, JP-3-271286, JP 4-282378, JP 5-059025, JP 5-222035, JP 5-222036, JP 5-222037, JP 6-199846, JP 10-045732, JP 2000-072768, JP 2000-344693, JP 2001-048875, JP 2002-226477, JP 2002-265468 and JP 2002-293784

We claim:

1. A germole-fused diarylethene-based compound, comprising at least one germanium-containing five-membered ring structure with an ethene bridge fused to photoactive bis-aryl rings, the germanium-containing five-membered ring structure with the ethene bridge fused to photoactive bis-aryl rings having the structure of formula (I):

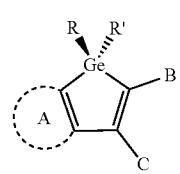

(I)

wherein:
A is a fused mono- or polycyclic ring fused to the germanium-containing five-membered ring or is a pair of R" substituents where A is unsubstituted, monosubstituted, or plurally independently substituted 5- or 6-membered arene, heteroacene or heterocycle, selected from benzene, pyridine, thiophene, furan, pyrazole, imidazole, oxazole, isoxazole, thiazole, isothiazole, isoquioline, pyrrole, pyrazine, pyridazine, pyrimidine, benzimidazole, benzofuran, benzothiazole, indole, naphthalene, anthracene, pyrene, triazole, tetrazole, pyran, thiapyran, oxadiazole, triazine, tetrazine, carbazole, dibenzothiophene, dibenzofuran, and fluorene;

R, R', R" and substituents on A are independently an alkyl, alkenyl, alkynyl, alkylaryl, cycloalkyl, haloformyl, hydroxyl, aldehyde, carboxamide, amino, alkoxy, azo, benzyl, carbonate ester, carboxylate, carboxyl, ketoamine, isocyanate, isocyanide, isothiocyanate, nitrile, nitro, nitroso, phosphine, phosphate, phosphono, pyridyl, silyl, sulfonyl, sulfo, sulfinyl, sulfhydryl, halo, aryl, substituted aryl, heteroaryl, substituted heteroaryl or a heterocyclic group; and B and C are the same or different and independently have the structure of formula (II) or formula (III):

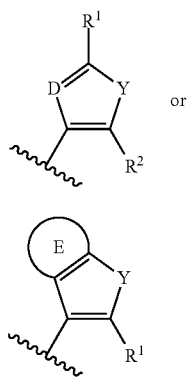

where:

D is C—$R^3$ or N;

$R^1$, $R^2$ and $R^3$ are independently selected from hydrogen, halogen, hydroxyl, alkyl, alkynyl, alkoxy, cyano, nitro group, alkylcarbonyl, alkoxycarbonyl, perfluoroalkyl, aryl, substituted aryl, heteroaryl, substituted heteroaryl, heterocyclic, cycloalkyl, arylcarbonyl, aryloxycarbonyl, diarylamino, dialkylamino, mono- or dialkylaminocarbonyl, alkylcaronyloxy, arylcarbonyloxy, aryloxy, alkoxycarbonyl, and aryloxycarbonyloxy;

Y is selected from S, $SO_2$, O, Se, Te and $NR^4$, where $R^4$ is hydrogen or an unsubstituted or a substituted alkyl, aryl or cycloalkyl; and E is an unsubstituted, monosubstituted, or plurally substituted 5- or 6-membered arene, heteroacene or heterocycle selected from benzene, pyridine, thiophene, furan, pyrazole, imidazole, oxazole, isoxazole, thiazole, isothiazole, isoquioline, pyrrole, pyrazine, pyridazine, pyrimidine, benzimidazole, benzofuran, benzothiazole, indole, naphthalene, anthracene, pyrene, triazole, tetrazole, pyran, thiapyran, oxadiazole, triazine, tetrazine, carbazole, dibenzothiophene, dibenzofuran, and fluorene; and substituents on $R^1$, $R^2$, $R^3$, $R^4$, and E are selected from alkyl, alkenyl, alkynyl, alkylaryl, cycloalkyl, haloformyl, hydroxyl, aldehyde, carboxamide, amino, alkoxy, azo, benzyl, carbonate ester, carboxylate, carboxyl, ketoamine, isocyanate, isocyanide, isothiocyanate, nitrile, nitro, nitroso, phosphine, phosphate, phosphono, pyridyl, silyl, sulfonyl, sulfo, sulfinyl, sulfhydryl, halo, aryl, substituted aryl, heteroaryl, substituted heteroaryl and heterocyclic groups.

2. The germole-fused diarylethene-based compound according to claim 1, wherein the germole-fused diarylethene-based compound is selected from the structures:

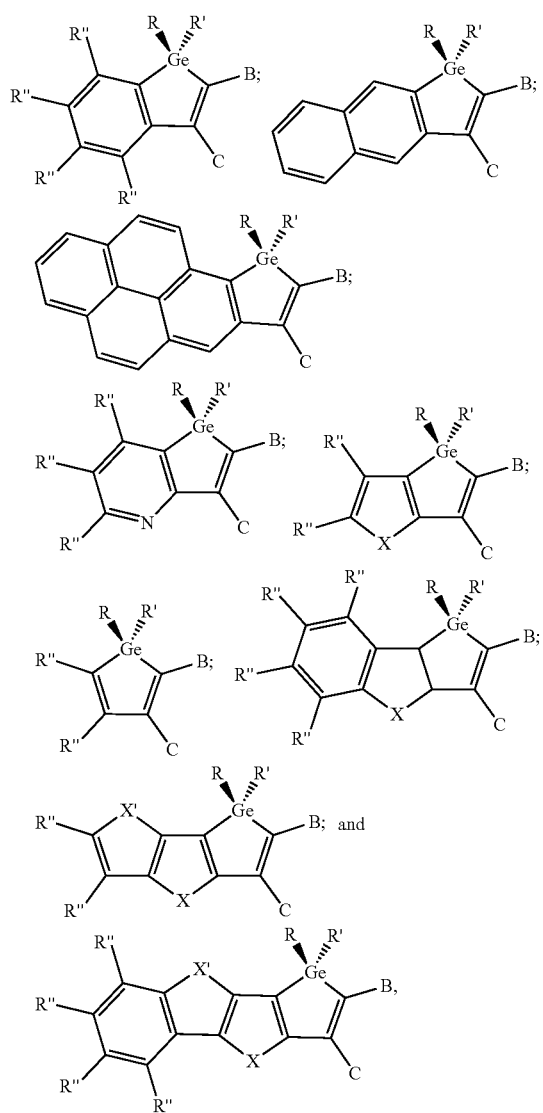

wherein X and X' are heteroatoms, independently selected from S, $SO_2$, O, Se and NR'", where R'" is alkyl, alkenyl, alkylaryl, cycloalkyl, haloformyl, hydroxyl, aldehyde, carboxamide, amino, alkoxy, azo, benzyl, carbonate ester, carboxylate, carboxyl, ketamine, isocyanate, isocyanide, isothiocyanate, nitrile, nitro, nitroso, phosphine, phosphate, phosphono, pyridyl, silyl, sulfonyl, sulfo, sulfinyl, sulfhydryl, halo, aryl, substituted aryl, heteroaryl, substituted heteroaryl or a heterocyclic group.

3. The germole-fused diarylethene-based compound according to claim 1, wherein B and C are independently selected from the structures:

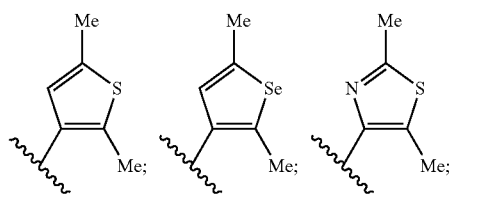

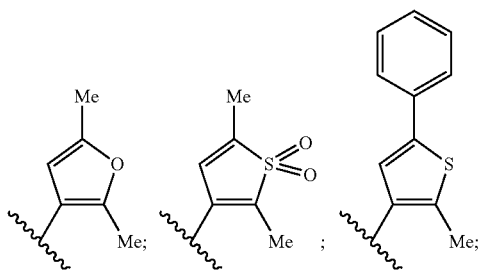

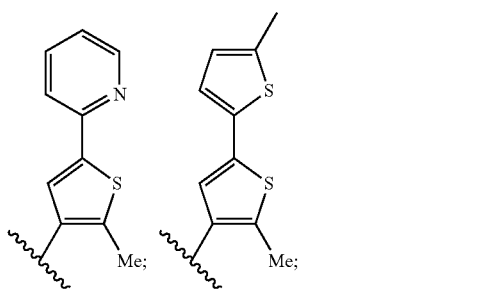

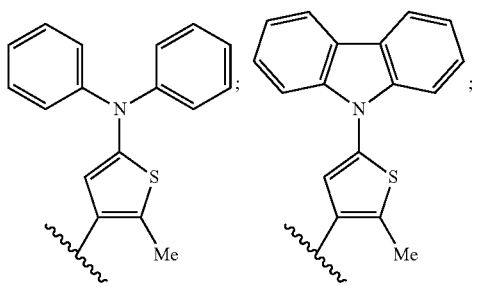

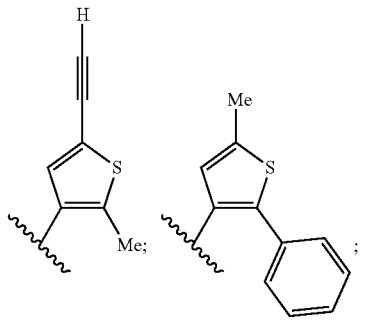

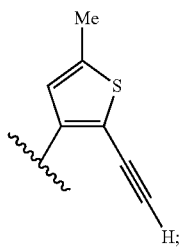

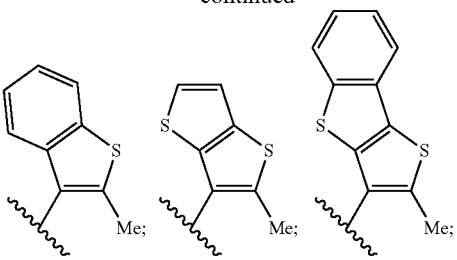

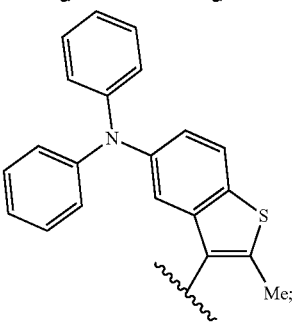

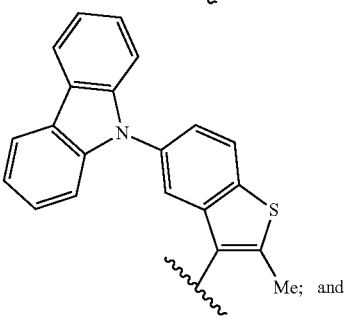

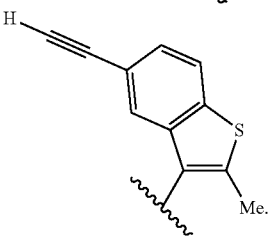

4. The germole-fused diarylethene-based compound according to claim 1, wherein the germole-fused diarylethene-based compound comprises a mixture where the structure of B and C are different and B and C of one component of the mixture is the structure of C and B, respectively, of the other component.

5. A germole-fused diarylethene-containing coordination complex, comprising a germole-fused diarylethene based compound according to claim 1, where B and/or C comprise substituted or unsubstituted aryl heterocyclic group containing one or more donor atoms X", wherein X" is independently selected from N, O, S, Se and P, coordinated to a coordination unit $[ML_n]$, wherein n is an integer from 0 to 5, M is a metal or main group element, selected from aluminium, zinc, gallium, indium, rhodium, manganese, nickel, iron, cobalt, copper, ruthenium, platinum, palladium, tin, vanadium, chromium, iridium, gadolinium, boron, beryllium, lanthanum, and L is a ligand selected independently from alkyl, alkenyl, alkylaryl, cycloalkyl, haloformyl, hydroxyl, aldehyde, carboxamide, amino, alkoxy, azo, benzyl, carbonate ester, carboxylate, carboxyl, ketamine, isocyanate, isocyanide, isothiocyanate, nitrile, nitro, nitroso, phosphine, phosphate, phosphono, pyridyl, silyl, sulfonyl, sulfo, sulfinyl, sulfhydryl, halo, aryl, substituted aryl, heteroaryl, substituted heteroaryl or a heterocyclic group, a cyclometalating bidentate ligand, a cyclometalating tridentate ligand, a cyclometalating tetradentate ligand, a non-cyclometalating bidentate ligand, a non-cyclometalating tridentate ligand, or a non-cyclometalating tetradentate ligand.

6. The germole-fused diarylethene-containing coordination complex according to claim 5, wherein the cyclometalating bidentate ligand is selected from 2-phenylpyridine, phenylisoquinoline, phenylquinoline, phenylpyrazole, 7,8-benzoquinolines, 1-phenylimidazol-2-ylidene and derivatives thereof.

7. The germole-fused diarylethene-containing coordination complex according to claim 5, wherein the cyclometalating tridentate ligand is selected from 2,6-diphenylpyridine, 1,3-di(2-pyridyl)benzene, 1,3-bis(benzimidazol-2'-yl)benzene, 2-(biphenyl-3-yl)pyridine, 6-phenyl-2,2'-bipyridine, 1,3-di(imidazol-2-yliden-1-yl)benzene and derivatives thereof.

8. The germole-fused diarylethene-containing coordination complex according to claim 5, wherein the cyclometalating tetradentate ligand is selected from 6,6-diphenyl-2,2'-bipyridine, 2,2'-(oxybis(3,1-phenylene))dipyridine and derivatives thereof.

9. The germole-fused diarylethene-containing coordination complex according to claim 5, wherein the non-cyclometalating bidentate ligand is selected from ethylenediamine, 2,2'-bipyridine, 1,10-phenanothroline, 1,2-bis(diphenylphosphino)ethane, (2,2'-bis(diphenylphosphino)-1,1'-binaphthyl), oxalate, acetylacetonate, 9-hydroxy-1H-phenalen-1-one, 8-hydroxyquinoline and derivatives thereof.

10. The germole-fused diarylethene-containing coordination complex according to claim 5, wherein the non-cyclometalating tridentate ligand is selected from 2,2':6',2''-terpyridine, 2,6-bis(benzimidazole-2'-yl)pyridine, 2,6-bis(1,2,3-triazol-4-yl)pyridine, subphthalocyanine and derivatives thereof.

11. The germole-fused diarylethene-containing coordination complex according to claim 5, wherein the non-cyclometalating tetradentate ligand is selected from triethylenetetramine, 2,2': 6',2:6,2'''-quaterpyridine, N,N-bis(salicylidene)ethylenediamine, porphyrin and derivatives thereof.

12. A method to prepare a germole-fused diarylethene-based compound, comprising:
providing a 1-germyl-aryl-2-boronic ester, 1-germyl-heteroaryl-2-boronic ester, or 1-germyl-alkenyl-2-boronic ester;
providing a 1,2-diarylethyne;
mixing the 1-germyl-aryl-2-boronic ester, 1-germyl-heteroaryl-2-boronic ester, or 1-germyl-alkenyl-2-boronic ester with the 1,2-diarylethyne and a rhodium comprising catalyst; and
forming the germole-fused diarylethene-based compound having the structure of formula (I):

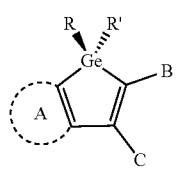

wherein:
A is a fused mono- or polycyclic ring fused to the germanium-containing five-membered ring or is a pair of R'' substituents where A is unsubstituted, monosubstituted, or plurally independently substituted 5- or 6-membered arene, heteroacene or heterocycle, selected from benzene, pyridine, thiophene, furan, pyrazole, imidazole, oxazole, isoxazole, thiazole, isothiazole, isoquioline, pyrrole, pyrazine, pyridazine, pyrimidine, benzimidazole, benzofuran, benzothiazole, indole, naphthalene, anthracene, pyrene, triazole, tetrazole, pyran, thiapyran, oxadiazole, triazine, tetrazine, carbazole, dibenzothiophene, dibenzofuran, and fluorene;

R, R', R'' and substituents on A are independently an alkyl, alkenyl, alkynyl, alkylaryl, cycloalkyl, haloformyl, hydroxyl, aldehyde, carboxamide, amino, alkoxy, azo, benzyl, carbonate ester, carboxylate, carboxyl, ketoamine, isocyanate, isocyanide, isothiocyanate, nitrile, nitro, nitroso, phosphine, phosphate, phosphono, pyridyl, silyl, sulfonyl, sulfo, sulfinyl, sulfhydryl, halo, aryl, substituted aryl, heteroaryl, substituted heteroaryl or a heterocyclic group; and B and C are the same or different and independently have the structure of formula (II) or formula (III):

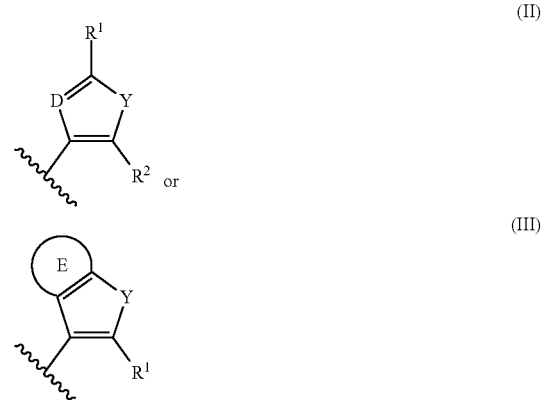

where:
D is C—$R^3$ or N;
$R^1$, $R^2$ and $R^3$ are independently selected from hydrogen, halogen, hydroxyl, alkyl, alkynyl, alkoxy, cyano, nitro group, alkylcarbonyl, alkoxycarbonyl, perfluoroalkyl, aryl, substituted aryl, heteroaryl, substituted heteroaryl, heterocyclic, cycloalkyl, arylcarbonyl, aryloxycarbonyl, diarylamino, dialkylamino, mono- or dialkylaminocarbonyl, alkylcaronyloxy, arylcarbonyloxy, aryloxy, alkoxycarbonyl, and aryloxycarbonyloxy;

Y is selected from S, $SO_2$, O, Se, Te and $NR^4$, where $R^4$ is hydrogen or an unsubstituted or a substituted alkyl, aryl or cycloalkyl; and E is an unsubstituted, monosubstituted, or plurally substituted 5- or 6-membered arene, heteroacene or heterocycle selected from benzene, pyridine, thiophene, furan, pyrazole, imidazole, oxazole, isoxazole, thiazole, isothiazole, isoquioline, pyrrole, pyrazine, pyridazine, pyrimidine, benzimidazole, benzofuran, benzothiazole, indole, naphthalene, anthracene, pyrene, triazole, tetrazole, pyran, thiapyran, oxadiazole, triazine, tetrazine, carbazole, dibenzothiophene, dibenzofuran, and fluorene; and substituents on $R^1$, $R^2$, $R^3$, $R^4$, and E are selected from alkyl, alkenyl, alkynyl, alkylaryl, cycloalkyl, haloformyl, hydroxyl, aldehyde, carboxamide, amino, alkoxy, azo, benzyl, carbonate ester, carboxylate, carboxyl, ketoamine, isocyanate, isocyanide, isothiocyanate, nitrile, nitro, nitroso, phosphine, phosphate, phosphono, pyridyl, silyl, sulfonyl, sulfo, sulfinyl, sulfhydryl, halo, aryl, substituted aryl, heteroaryl, substituted heteroaryl and heterocyclic groups.

13. The method of claim 12, further comprising isolating the germole-fused diarylethene-based compound.

14. The method of claim 12, wherein the rhodium comprising catalyst comprises chloro(1,5-cyclooctadiene)rhodium(I) dimer, $[RhCl(COD)]_2$, in the presence of a nucleophilic tertiary amine.

15. The method of claim 14, wherein the nucleophilic tertiary amine is 1,4-diazabicyclo[2.2.2]octane (DABCO).

16. A device comprising a germole-fused diarylethene-based compound having the structure of formula (I):

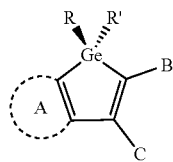

(I)

wherein:

A is a fused mono- or polycyclic ring fused to the germanium-containing five-membered ring or is a pair of R'' substituents where A is unsubstituted, monosubstituted, or plurally independently substituted 5- or 6-membered arene, heteroacene or heterocycle, selected from benzene, pyridine, thiophene, furan, pyrazole, imidazole, oxazole, isoxazole, thiazole, isothiazole, isoquioline, pyrrole, pyrazine, pyridazine, pyrimidine, benzimidazole, benzofuran, benzothiazole, indole, naphthalene, anthracene, pyrene, triazole, tetrazole, pyran, thiapyran, oxadiazole, triazine, tetrazine, carbazole, dibenzothiophene, dibenzofuran, and fluorene;

R, R', R'' and substituents on A are independently an alkyl, alkenyl, alkynyl, alkylaryl, cycloalkyl, haloformyl, hydroxyl, aldehyde, carboxamide, amino, alkoxy, azo, benzyl, carbonate ester, carboxylate, carboxyl, ketoamine, isocyanate, isocyanide, isothiocyanate, nitrile, nitro, nitroso, phosphine, phosphate, phosphono, pyridyl, silyl, sulfonyl, sulfo, sulfinyl, sulfhydryl, halo, aryl, substituted aryl, heteroaryl, substituted heteroaryl or a heterocyclic group; and B and C are the same or different and independently have the structure of formula (II) or formula (III):

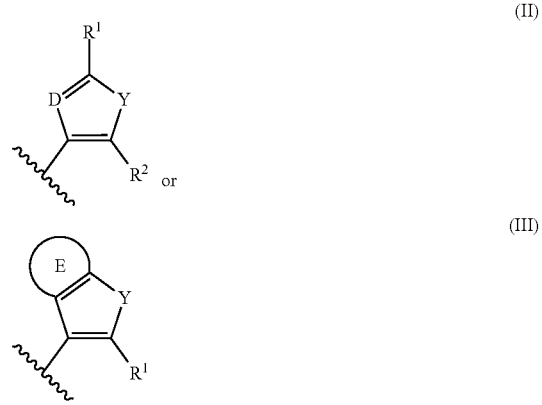

where:

D is C—$R^3$ or N;

$R^1$, $R^2$ and $R^3$ are independently selected from hydrogen, halogen, hydroxyl, alkyl, alkynyl, alkoxy, cyano, nitro group, alkylcarbonyl, alkoxycarbonyl, perfluoroalkyl, aryl, substituted aryl, heteroaryl, substituted heteroaryl, heterocyclic, cycloalkyl, arylcarbonyl, aryloxycarbonyl, diarylamino, dialkylamino, mono- or dialkylaminocarbonyl, alkylcaronyloxy, arylcarbonyloxy, aryloxy, alkoxycarbonyl, and aryloxycarbonyloxy;

Y is selected from S, $SO_2$, O, Se, Te and $NR^4$, where $R^4$ is hydrogen or an unsubstituted or a substituted alkyl, aryl or cycloalkyl; and E is an unsubstituted, monosubstituted, or plurally substituted 5- or 6-membered arene, heteroacene or heterocycle selected from benzene, pyridine, thiophene, furan, pyrazole, imidazole, oxazole, isoxazole, thiazole, isothiazole, isoquioline, pyrrole, pyrazine, pyridazine, pyrimidine, benzimidazole, benzofuran, benzothiazole, indole, naphthalene, anthracene, pyrene, triazole, tetrazole, pyran, thiapyran, oxadiazole, triazine, tetrazine, carbazole, dibenzothiophene, dibenzofuran, or fluorene; and substituents on $R^1$, $R^2$, $R^3$, $R^4$, and E are selected from alkyl, alkenyl, alkynyl, alkylaryl, cycloalkyl, haloformyl, hydroxyl, aldehyde, carboxamide, amino, alkoxy, azo, benzyl, carbonate ester, carboxylate, carboxyl, ketoamine, isocyanate, isocyanide, isothiocyanate, nitrile, nitro, nitroso, phosphine, phosphate, phosphono, pyridyl, silyl, sulfonyl, sulfo, sulfinyl, sulfhydryl, halo, aryl, substituted aryl, heteroaryl, substituted heteroaryl and heterocyclic groups, wherein the device is an optical recording device or a photoswitchable molecular devices.

* * * * *